(12) United States Patent
Nakaue et al.

(10) Patent No.: US 8,337,714 B2
(45) Date of Patent: Dec. 25, 2012

(54) FERRITE POWDERS FOR BONDED MAGNET, PROCESS FOR THE PRODUCTION OF THE POWDERS, AND BONDED MAGNET MADE BY USING THE SAME

(75) Inventors: Kazuyuki Nakaue, Okayama (JP); Shinichi Suenaga, Okayama (JP); Masahiro Kojima, Okayama (JP); Hiroya Ikeda, Okayama (JP); Satoru Tsuboi, Okayama (JP)

(73) Assignees: Dowa Electronics Materials Co., Ltd., Tokyo (JP); Dowa F-Tec Co., Ltd., Okayama (JP)

( * ) Notice: Subject to any disclaimer, the term of this patent is extended or adjusted under 35 U.S.C. 154(b) by 0 days.

(21) Appl. No.: 12/733,854

(22) PCT Filed: Sep. 26, 2008

(86) PCT No.: PCT/JP2008/067472
§ 371 (c)(1),
(2), (4) Date: May 20, 2010

(87) PCT Pub. No.: WO2009/041606
PCT Pub. Date: Apr. 2, 2009

(65) Prior Publication Data
US 2010/0295643 A1    Nov. 25, 2010

(30) Foreign Application Priority Data

Sep. 28, 2007 (JP) .................................. 2007-253364
Sep. 25, 2008 (JP) .................................. 2008-246834

(51) Int. Cl.
*C04B 35/64* (2006.01)

(52) U.S. Cl. .................................................. 252/62.59

(58) Field of Classification Search ............ 252/62.51 R, 252/62.59, 62.56; 335/297; 148/100, 306, 148/319, 336, 62.51 R, 62.59, 62.56
See application file for complete search history.

(56) References Cited

U.S. PATENT DOCUMENTS

| | | | | |
|---|---|---|---|---|
| 4,781,981 A * | 11/1988 | Katamoto et al. | ............ | 428/403 |
| 5,246,609 A * | 9/1993 | Nakata et al. | ............ | 252/62.59 |
| 5,384,182 A * | 1/1995 | Ito et al. | ............ | 428/212 |
| 7,384,571 B2 * | 6/2008 | Senda et al. | ............ | 252/62.54 |
| 2006/0145118 A1 * | 7/2006 | He et al. | ............ | 252/62.59 |
| 2007/0131893 A1 * | 6/2007 | Senda et al. | ............ | 252/62.54 |
| 2007/0138432 A1 * | 6/2007 | Minachi et al. | ............ | 252/62.63 |
| 2008/0220962 A1 * | 9/2008 | Akedo et al. | ............ | 501/93 |

FOREIGN PATENT DOCUMENTS

| | | |
|---|---|---|
| JP | A-59-135705 | 8/1984 |
| JP | A-60-39136 | 2/1985 |
| JP | B2-63-034610 | 7/1988 |
| JP | 09106904 A * | 4/1997 |
| JP | A-9-106904 | 4/1997 |
| JP | A-2001-52912 | 2/2001 |
| JP | A-2005-158845 | 6/2005 |

OTHER PUBLICATIONS

International Search Report issued in International Application No. PCT/JP2008/067472 by the International Bureau on Dec. 22, 2008. (with English translation).

International Preliminary Report on Patentability issued by the International Bureau in International Patent Application No. PCT/JP2008/067472 on May 4, 2010. (with English-language translation).

* cited by examiner

*Primary Examiner* — Emily Le
*Assistant Examiner* — Lynne Edmondson
(74) *Attorney, Agent, or Firm* — Oliff & Berridge, PLC

(57) ABSTRACT

The present invention provides ferrite powders for bonded magnet capable of suppressing increase of SFD, while widening a particle size distribution for obtaining flowability and compressed density, and also capable of suppressing deterioration of orientation and magnetizability, and provides a process for a production magnetoplumbite-type ferrite powders containing an oxide of at least one or more kinds of transition metals selected from a group consisting of Zr, Ti, Zn, Co, Mn, and Ni, having a mean particle size of 0.20 μm or more and less than 5.00 μm, being the ferrite powders for bonded magnet with the ratio of particles having particle size of 1 μm or less being 20 mass % or more in the magnetoplumbite-type ferrite powder size distribution obtained by a laser diffraction type particle size distribution analyzer.

8 Claims, No Drawings

FERRITE POWDERS FOR BONDED MAGNET, PROCESS FOR THE PRODUCTION OF THE POWDERS, AND BONDED MAGNET MADE BY USING THE SAME

TECHNICAL FIELD

The present invention relates to ferrite powders for bonded magnet and a process for the production of the powders, and a bonded magnet made by using the same.

DESCRIPTION OF RELATED ART

A ferrite sintered magnet is used in a magnet for audio visual (AV), office automation (OA) equipment, a small sized motor used for automobile electrical parts, and a magnet roll, etc, of a copying machine, for which a high magnetism is required. However, the aforementioned ferrite sintered magnet has a problem specific thereto, such that a chip and cracking occurs, polishing is required and therefore productivity is deteriorated, and also processing into a complicated shape is difficult. In recent years, a bonded magnet using a rare-earth magnet is sometimes used in this field. However, there is a problem that the rare-earth magnet requires a high cost of 20 times the cost of the ferrite sintered magnet, and is easily rusted. Therefore, it is requested that the ferrite sintered magnet is substituted with the ferrite bonded magnet.

However, a content percentage of ferrite is largely different, between the bonded magnet and the sintered magnet. For example, the ferrite bonded magnet contains a binder such as resin and rubber, while the ferrite sintered magnet contains only ferrite. Therefore, as a matter of course, a content percentage of the ferrite is lower in the ferrite bonded magnet, than that of the ferrite sintered magnet, and a magnetic force is also lowered. Accordingly, in order to increase the magnetic force of the ferrite bonded magnet, it is an indispensable subject to increase the content percentage of the ferrite powders. However, when the content percentage of the ferrite powders is increased in the ferrite bonded magnet, a kneaded material has a high viscosity this time, when the ferrite powders and the binder are kneaded, thus increasing a load and deteriorating the productivity, resulting in a state impossible to be kneaded in an extreme case. Then, even if kneading is achieved, the productivity is still deteriorated, due to inferior flowability of the kneaded material even in a case of molding, resulting in a state impossible to be molded, in an extreme case.

In order to solve the above-described problem specific to the ferrite bonded magnet, improvement in terms of a selection of the binder and a surface treatment of the ferrite powders, is tried. For example, patent document 1 discloses a method of mixing ferrite fine powders having a mean particle size set in a range of 0.5 to 1.5 µm, and ferrite coarse powders having a mean particle size set in a range of 30 to 250 µm.

Patent document 1: Japanese Patent Publication No. 1988-34610 (JP-B2-63-034610)

DISCLOSURE OF THE INVENTION

Problem to be solved by the Invention

However, as a result of examination by inventors of the present invention, it is found that although the ferrite powders having a high compressed density and high filling properties can be obtained by a method described in patent document 1, there is a problem that SFD is increased, which is important in terms of a degree of orientation.

Under such a circumstance, the present invention is provided, and an object of the present invention is to provide the ferrite powders for bonded magnet capable of keeping the degree of the orientation while expanding a particle size distribution width to obtain the flowability and the compressed density, and capable of manufacturing the bonded magnet having a high magnetic force.

Note that in the present invention, SFD refers to a value obtained by dividing a half value width of a distribution curve of iHc by iHc, which is obtained by differentiating a hysteresis curve. As the value of the SFD is smaller, the iHc distribution width becomes smaller.

Means for solving the Problem

As a result of strenuous efforts by inventors of the present invention to solve the above-described problem, it is found that M-type ferrite having a large particle size distribution and M-type ferrite having a small particle size distribution, are set in a trade-off relation, because if they are mixed with each other, a distribution width of iHc is expanded, and therefore the value of SFD is increased and the degree of the orientation is decreased. iHc is described by a crystal anisotropy, a shape anisotropy, and a single magnetic domain structure, and if a mean particle size is smaller, a structure of each particle is close to a single magnetic domain structure, and therefore iHc becomes larger.

Here, the inventors of the present invention achieves a structure in which a suitable amount of transition metal oxide is contained in the M-type ferrite powders having the small particle size distribution, and iHc of the M-type ferrite powders having the small particle size distribution is made to be close to the iHc of the M-type ferrite having the large particle size distribution. Then, the inventors of the present invention obtains a breakthrough knowledge that by mixing magneto-plumbite type powders having a large and small particle size distribution, with iHc being close to each other, the degree of the orientation can be increased while keeping the flowability of the kneaded material, and the present invention is completed.

Namely, in order to solve the above-described problem, according to a first invention, ferrite powders for bonded magnet is provided, which are magneto-plumbite type ferrite powders having a mean particle size in a range of 0.20 µm or more and less than 5.00 µm, and containing an oxide of at least one or more kinds of transition metals selected from a group consisting of Zr, Ti, Zn, Co, Mn, and Ni, wherein a ratio of the particles having a particle size of 1 µm or less is 20 mass % or more, in a particle distribution of the magneto-plumbite type ferrite powders obtained by a laser diffraction type particle size distribution analyzer.

According to a second invention, ferrite powders for bonded magnet is provided, having a mean particle size set in a range of 0.20 µm or more and less than 1.00 µm, and containing magneto-plumbite type ferrite fine powders containing an oxide of at least one kind or more transition metals selected from a group consisting of Zr, Ti, Zn, Co, Mn, and Ni, and magneto-plumbite type ferrite coarse powders having a mean particle size set in a range of 1.00 µm or more and less than 5.00 µm, wherein a mixed amount of the magneto-plumbite type ferrite fine powders is 15 mass % or more and 40 mass % or less.

According to a third invention, the ferrite powders for bonded magnet according to the second invention is provided, wherein 0.01 mass % or more and 3 mass % or less of Zr oxide and/or Ti oxide is contained in the magneto-plumbite type ferrite fine powders containing the oxide of the transition metals.

According to a fourth invention, the ferrite powders for bonded magnet according to the second invention is provided, wherein 0.01 mass % or more and 3 mass % or less of Ti oxide and Zn oxide is contained in the magneto-plumbite type ferrite fine powders containing the oxide of the transition metals.

According to a fifth invention, a process for a production of ferrite powders for bonded magnet is provided, comprising the steps of:

preparing magneto-plumbite type ferrite containing a transition metal oxide, to obtain fine powders having a mean particle size set in a range of 0.20 μm or more and less than 1.00 μm;

preparing the magneto-plumbite type ferrite, to obtain coarse powders having a mean particle size set in a range of 1.00 μm or more and less than 5.00 μm; and mixing the fine powders and the coarse powders, to produce ferrite powders with a mixing ratio of the fine powders and the coarse powders set so that a mixed amount of fine powders is 15 mass % or more and 40 mass % or less, and coarse powders occupy a remained portion.

According to a sixth invention, a bonded magnet is provided, wherein the ferrite powders for bonded magnet according to any one of the first to fourth inventions are used as magnetic powders.

Advantage of the Invention

According to the present invention, the ferrite powders for producing the bonded magnet can be obtained, with small SFD and a high saturation magnetization σs, in spite of a wide particle size distribution width and a high compressed density.

DESCRIPTION OF PREFERRED
EMBODIMENTS OF THE INVENTION

The ferrite powders for bonded magnet of the present invention will be described hereinafter in detail. Note that in this specification, "%," indicates a mass percentage as long as not particularly specified.

According to an examination by the inventors of the present invention, in order to achieve a high magnetization in the ferrite bonded magnet, it is an indispensable requirement to (1) fill the bonded magnet with the ferrite powders in a high ratio, and (2) increase the degree of an orientation of ferrite powders.

Embodiments and a process for a production for satisfying the requirements (1) and (2) will be described hereinafter.

<1. High-Filling Ferrite Powders into a Bonded Magnet>

It is effective to increase a particle size distribution width of the ferrite powders, to obtain a high-filling ferrite powders.

Inventors of the present invention perform wide examination and research to know a production condition, in which high filling property and high degree of orientation of the magneto-plumbite type ferrite powders is achieved.

Then, as a result of the examination and research, it is found that the high filling property is achieved by the ferrite powders for bonded magnet, being the magneto-plumbite type ferrite powders having a mean particle size set in a range of 0.20 μm or more and less than 5.00 μm, and containing an oxide of at least one kind or more transition metals selected from a group consisting of Zr, Ti, Zn, Co, Mn, and Ni, with a ratio of particles having a particle size of 1 μm or less is 20 mass % or more in a particle size distribution of the magneto-plumbite type ferrite powders obtained by a laser diffraction type particle size distribution analyzer.

Note that the magneto-plumbite type ferrite (called "M-type ferrite" in some cases) in the present invention refers to a ferrite expressed by a general formula "$AFe_{12}O_{19}$". However, element A is, for example, an element of one or more kinds of Sr, Ba, Ca, and Pb. Further, the element A also includes an element obtained by substituting a part of Fe, with trivalent element such as Al, or tetravalent element and bivalent element such as Ti and Co.

Also, it is found by the inventors of the present invention that high filing property is achieved by powders obtained by mixing the magneto-plumbite type ferrite fine powders having a mean particle size set in a range of 0.20 μm or more and less than 1.00 μm, and M-type ferrite coarse powders having a mean particle size set in a range of 1.00 μm or more and less than 5.00 μm, preferably in a range of 1.3 μm or more and less than 2.2 μm with a mixed amount of the magneto-plumbite type ferrite fine powders set to 15 to 40% in the mixture, said magneto-plumbite type ferrite fine powders having a mean particle size set in a range of 0.30 μm or more and less than 1.00 μm.

<Improvement of the Degree of Orientation of the Ferrite Powders>

According to the examination by the inventors of the present invention, it is effective to make the SFD of the ferrite powders small, to obtain the ferrite powders with high orientation, and improvement of a magnetic waveform of a motor is expected. However, as described in <1>, it is effective to expand the particle size distribution width and increase the compressed density, to increase the filling property of the ferrite powders, and therefore the SFD is also increased. In order to overcome such a trade-off relation and make high orientation and the high filling properties compatible, the inventors of the present invention achieves a structure in which iHc of the fine particle portion and iHc of a coarse powder portion are closed to each other.

In order to realize such a structure, the inventors of the present invention perform wide examination and research regarding the ferrite.

As a result, it is found that iHc of the fine particle portion becomes low by adding 0.01 to 3.00%, preferably 0.5 to 2.5% of a transition metal oxide to the magneto-plumbite type ferrite fine powders, then a difference between the fine particle portion and the coarse powder portion is contracted, and magnetic powders with small SFD as an entire body of the magneto-plumbite type ferrite can be obtained. Note that an effect of decreasing iHc is exhibited if an addition amount of the transition metal oxide is 0.01% or more, and an excessive decrease of iHc can be prevented if the addition amount is 3.00% or less.

Further, according to the examination by the inventors of the present invention, as a kind of the transition metal oxide, Zr, Ti, Zn, Co, Mn, or Ni, and an oxide obtained by arbitrarily combining them, is preferable in terms of controlling iHc. Among them, an oxide containing either one of Zr and Ti or both of them, and an oxide containing both elements of Ti and Zn are preferable, from a viewpoint of improving σs.

<3. Process for Producing the Ferrite Powders>

In order to produce the magneto-plumbite type ferrite powders of the present invention, first, a fine powdery raw material and a rough powdery raw material are prepared.

As the fine powdery raw material, for example, the ferrite containing the transition metal oxide is pulverized or is classified after pulverization, to thereby obtain fine powders having a mean particle size set in a range of 0.20 μm or more and less than 1.00 μm. When the ferrite is pulverized, by setting the mean particle size to 0.20 μm or more, longer pulverization time can be prevented, and deterioration of magnetizability during producing the bonded magnet can also be prevented.

Meanwhile, by setting the mean particle size to less than 1.00 μm, the ratio of the particles having particle size beyond 1.00 μm is reduced. By reducing the ratio of the particles having particle size beyond 1.00 μm, the compressed density of mixed powders can be increased when the fine powders and coarse powders as will be described later are mixed with each other, and high-filling into the bonded magnet can be realized.

Meanwhile, as the rough powdery raw material, for example, the ferrite having the means particle size set in a range of 3.0 μm or more and less than 4.0 μm is prepared, and this ferrite is pulverized or classified after pulverization, to thereby obtain the rough powder having the mean particle size set in a range of 1.00 μm or more and less than 50 μm. By reducing the ratio of the particles having the particle size of less than 1.00 μm at the time of pulverization, the compressed density of the mixed powders can be increased in the mixed powders of the fine powders and coarse powders as described above, and high-filling into the bonded magnet can be realized.

Meanwhile, by reducing the ratio of the particles having the particle size beyond 5.00 μm, the degree of orientation and a coercive force during production of the bonded magnet can be kept high.

The prepared fine powders having the mean particle size set in a range of 0.20 μm or more and less than 1.00 μm, and coarse powders having the mean particle size set in a range of 1.00 μm or more and less than 5.00 μm are mixed with each other, to thereby produce the ferrite powders with a mixing ratio of the fine powders and the coarse powders set so that a mixed amount of fine powders is 15 mass % or more and 40 mass % or less, and coarse powders occupy a remained portion.

When the mixed amount of the fine powders is 15% or more, the compressed density of the mixed powders can be increased, high-filling can be realized, and the coercive force can also be increased after being molded into the bonded magnet. Meanwhile, when the mixed amount of the fine powders is 40% or less, it would be possible to avoid a state in which the viscosity is excessively increased during kneading into the binder and molding into the bonded magnet, thereby making it difficult to form the bonded magnet, and further possible to avoid a state in which the degree of orientation of the magnetic powders is decreased after molding, thereby also decreasing residual magnetic flux density Br.

After mixing the fine powders and coarse powders in the above-described mixing ratio, annealing is applied to the mixed powders or the fine powders and the coarse powders are previously subjected to annealing and thereafter mixed, to thereby obtain the ferrite powders for bonded magnet according to the present invention. By this annealing, strain generated in the crystal of each particle can be removed, at the time of pulverization in producing the fine powders and coarse powders. The annealing temperature is preferably set to 800 to 1100° C. When the annealing temperature is set to 800° C. or more, an effect of annealing is sufficiently achieved, and the coercive force and the saturation magnetization can be increased. Further, when the annealing temperature is set to 1100° C. or less, excessive progress of sintering can be avoided, and the decrease of the compressed density and orientation can be avoided.

<4. Property of the Ferrite Powders of the Present Invention>

As described above in detail, the ferrite powders of the present invention can be filled into the bonded magnet in a high ratio, and also the degree of orientation of the ferrite powders can be increased. Accordingly, by using the ferrite powders of the present invention, the bonded magnet having a high magnetic force can be provided, which is not conventionally known in a field of AV, OA equipment, a small sized motor used for automobile electrical parts, and a magnet roll, etc, of a copying machine.

EXAMPLES

Examples of the present invention will be described hereinafter in detail. However, the present invention is not limited thereto.

First, a measuring method of powder properties of the produced ferrite powders will be described in this example.

<Mean Particle Size>

The mean particle size of the ferrite powders was measured based on an air permeability method, by using a model SS-100 by Shimadzu Corporation.

<Specific Surface Area>

A specific surface area (SSA) of the ferrite powders was measured by using MONOSORB by Yuasa ionics. Corporation, based on a BET method.

<Compressed Density>

The compressed density of the ferrite powders was measured, by compressing the ferrite powders under pressure of 1 ton/cm$^3$, after filling 10 g of ferrite powders into a cylindrical mold having an inner diameter of 2.54 cmφ. The density of the ferrite powders at this time was set as the compressed density.

<Magnetizability>

Regarding the magnetizability of the ferrite powders, measurement of σs (emu/g), SFD was performed by using VSM (VSM-P7 by TOEI INDUSTRY CO., LTD.).

<Particle Size Distribution>

The particle size distribution of the ferrite powders was measured under conditions of focal length=20 mm, dispersion pressure 5.0 bar, and suction pressure 130 mbar, by using a dry-type laser diffraction type particle size distribution analyzer (HELOS&RODOS produced by Japan Laser Corporation).

Example 1

(1) Production of Fine Powders

Ion oxide and strontium carbonate were weighed in a molar ratio of 5.6:1 respectively, and 0.5 mass % of $ZrO_2$ was added and mixed into the weighed material. Next, the mixture thus obtained was granulated by water and dried, and thereafter sintered at 1020° C. for 40 minutes in an electric furnace, to thereby obtain a sintered material. The sintered material thus obtained was pulverized by a hammer mill (product name: sample mill), and was further subjected to wet type pulverization using a wet type pulverization machine (product name: wet mill), to thereby obtain fine powders of example 1.

The obtained fine powders contain 0.5 mass % of $ZrO_2$, with mean particle size: 0.65 μm, and σs: 57.3 emu/g.

(2) Production of Coarse Powders

Iron oxide and strontium carbonate were weighed and mixed in a molar ratio of 5.6:1 respectively. Next, the mixture thus obtained was granulated by water and dried, and thereafter sintered at 1200° C. for 2 hours in the electric furnace, to thereby obtain the sintered material. The sintered material thus obtained was pulverized by a sample mill, and was further subjected to wet type pulverization using a wet type pulverization machine (product name: wet mill), to thereby obtain coarse powders of the example 1.

The obtained coarse powders have mean particle size: 2.11 μm, and σs: 54.4 emu/g.

(3) Production of Mixed Powders (Ferrite Powders)

The fine powders (20%) obtained by (1) and the coarse powders (80%) obtained by (2) were weighed and mixed sufficiently, and the mixed powders were subjected to annealing for 1 hour at 950° C. in the electric furnace, to thereby obtain the ferrite powders of the example 1.

The obtained ferrite powders have: mean particle size: 1.22 μm, specific surface area: 2.48 m$^2$/g, compressed density: 3.45 g/cm$^3$, σs: 57.4 emu/g, and SFD: 0.9129.

(4) Production of the Bonded Magnet 0.6 pts of silane-based coupling agent (Z-6094N by TORAY DOW CORNING Co., Ltd.) was added to 90 pts of ferrite powders obtained by (3), and was stirred by a mixer (Model SK-10 by KYOHRITSU ELECTRONIC INDUSTRY Co., Ltd.), to thereby apply a surface treatment to the ferrite powders. Next, 8.6 pts of powdery 6-nilon (P-1011F by UBE INDUSTRIES.LTD.) and 0.8 pts. of a lubricant (VPN-212P by Henkel Co., Ltd) were added to the ferrite powders, to thereby obtain the mixture.

Subsequently, the mixture was kneaded and palletized at 230° C. by using a kneading machine (Model 100C100 by TOYO SEIKI SEISAKUSYO Co., Ltd.). Then, an injection molding of the kneaded pellet was performed in a magnetic field of 3.4 KOe, to thereby obtain a cylindrical anisotropic bonded magnet of the example 1, with a diameter 15 mm×height 8 mm. Here, the kneading and the injection molding could be performed smoothly.

When the magnet of the example 1 was measured by a BH tracer, SQ(Area) 0.893, Hk/iHc0.803 was shown. Results were shown in a list of table 1.

Example 2

The ferrite powders of example 2 was obtained by a similar operation as the operation of the example 1 other than a point that ZrO$_2$ addition amount was set to 2.0 mass %, during production of the fine powders of (1) in the example 1.

The mean particle size, specific surface area, compressed density, σs, and a measured value of SFD of the ferrite powders of the example 2 were described in table 1, and the particle size distribution of the ferrite powders was described in table 2.

Note that in the table 2, D5, D10, . . . D90 are respectively particle sizes at points of 5%, 10%, . . . and 90% of a cumulative particle size distribution. Meanwhile, 0.3 μm↓ (0.3 μm under), 1 μm↓ (1 μm under), . . . 14.6 μm↑ (14.6 μm upper) are respectively the existence ratio of the particles of 0.3 μm or less, the existence ratio of the particles of 1 μm or less, . . . and the existence ratio of the particle of 14.6 μm or more.

Example 3

The ferrite powders of example 3 was obtained by a similar operation as the operation of the example 1 other than a point that the fine powders (30%) obtained by (1) and the coarse powders (70%) obtained by (2) were weighed and mixed sufficiently in the example 1.

The mean particle size, specific surface area, compressed density, σs, and the measured value of SFD of the ferrite powders of the example 3 were described in table 1, and the particle size distribution of the ferrite powders was described in table 2.

Example 4

The ferrite powders of example 4 was obtained by the similar operation as the operation of the example 1 other than a point that TiO$_2$ was selected as the kind of a transition fiber metal oxide to be added in producing the fine powders of (1) in the example 1, with the addition amount set to 2.0 mass %.

The mean particle size, specific surface area, compressed density, σs, and the measured value of SFD of the ferrite powders of the example 4 were described in table 1.

Example 5

The ferrite powders of example 5 was obtained by the similar operation as the operation of the example 1 other than a point that the molar ratio of the iron oxide and the strontium carbonate in producing the fine powders of (1) in the example 1 was set to 5.8:1 respectively.

The mean particle size, specific surface area, compressed density, σs, and the measured value of SFD of the ferrite powders of the example 5 were described in table 1.

Example 6

The ferrite powders of example 6 was obtained by the similar operation as the operation of the example 1 other than a point that the fine powders and the coarse powders were weighed and mixed sufficiently, wherein the fine powders (30%) were obtained by setting the molar ratio of the iron oxide and the strontium carbonate in producing the fine powders of (1) in the example 1 to 5.5:1 respectively and selecting TiO$_2$ as the kind of the transition metal oxide to be added and setting the addition amount to 0.05 mass %, and the coarse powders (70%) were obtained by setting the molar ratio of the iron oxide and the strontium carbonate in producing the coarse powders of (2) to 5.9:1 respectively and performing sintering at 1230° C. in the electric furnace.

The mean particle size, specific surface area, compressed density, σs, and the measured value of SFD of the ferrite powders of the example 6 were described in table 1, and the particle size distribution of the ferrite powders was described in table 2.

Example 7

The ferrite powders of example 7 was obtained by the similar operation as the operation of the example 1 other than a point that the fine powders and the coarse powders were weighed and mixed sufficiently, wherein the fine powders (30%) were obtained by setting the molar ratio of the iron oxide and the strontium carbonate in producing the fine powders of (1) in the example 1 to 5.5:1 respectively and selecting TiO$_2$ as the kind of the transition metal oxide to be added and setting the addition amount to 0.5 mass %, and the coarse powders (70%) were obtained by setting the molar ratio of the iron oxide and the strontium carbonate in producing the coarse powders of (2) to 5.9:1 respectively and performing sintering at 1230° C. in the electric furnace.

The mean particle size, specific surface area, compressed density, σs, and the measured value of SFD of the ferrite powders of the example 7 were described in table 1, and the particle size distribution of the ferrite powders was described in table 2.

Example 8

The ferrite powders of example 8 was obtained by the similar operation as the operation of the example 1 other than a point that the fine powders and the coarse powders were weighed and mixed sufficiently, wherein the fine powders (30%) were obtained by setting the molar ratio of the iron oxide and the strontium carbonate in producing the fine powders of (1) in the example 1 to 5.5:1 respectively, setting the kind of the added transition metal oxide to $TiO_2+ZnO$, and setting the addition amount to 0.1 mass %+0.1 mass %=0.2 mass %, and the coarse powders (70%) were obtained by setting the molar ratio of the iron oxide and the strontium carbonate in producing the coarse powders of (2) to 5.9:1 respectively and performing sintering at 1230° C. in the electric furnace.

The mean particle size, specific surface area, compressed density, σs, and the measured value of SFD of the ferrite powders of the example 8 were described in table 1, and the particle size distribution of the ferrite powders was described in table 2.

Example 9

The ferrite powders of example 9 was obtained by the similar operation as the operation of the example 1 other than a point that fine powders and the coarse powders were weighed and mixed sufficiently, wherein the fine powders (30%) were obtained by setting the molar ratio of the iron oxide and the strontium carbonate in producing the fine powders of (1) in the example 1 to 5.5:1 respectively, and setting the kind of the added transition metal oxide to $TiO_2+ZnO$, and setting the addition amount to 1.0 mass %+1.0 mass %=2.0 mass %, and the coarse powders (70%) were obtained by setting the molar ratio of the iron oxide and the strontium carbonate in producing the coarse powders of (2) to 5.9:1 respectively and performing sintering at 1230° C. in the electric furnace.

The mean particle size, specific surface area, compressed density, σs, and the measured value of SFD of the ferrite powders of the example 9 were described in table 1, and the particle size distribution of the ferrite powders was described in table 2.

Example 10

The ferrite powders of example 10 was obtained by the similar operation as the operation of the example 1 other than a point that the fine powders and the coarse powders were weighed and mixed sufficiently, wherein the fine powders (30%) were obtained by setting the molar ratio of the iron oxide and the strontium carbonate in producing the fine powders of (1) in the example 1 to 5.5:1 respectively, and setting the kind of the added transition metal oxide to $TiO_2+ZrO_2$, and setting the addition amount to 1.0 mass %+1.0 mass %=2.0 mass %, and the coarse powders (70%) were obtained by setting the molar ratio of the iron oxide and the strontium carbonate in producing the coarse powders of (2) to 5.9:1 respectively and performing sintering at 1230° C. in the electric furnace.

The mean particle size, specific surface area, compressed density, σs, and the measured value of SFD of the ferrite powders of the example 10 were described in table 1, and the particle size distribution of the ferrite powders was described in table 2.

Comparative Example 1

The ferrite powders and the bonded magnet according to comparative example 1 were obtained by the similar operation as the operation of the example 1, other than a point that $ZrO_2$ was not added in producing the fine powders of (1) in the example 1.

The mean particle size, specific surface area, compressed density, σs, and the measured value of SFD of the ferrite powders of the comparative example 1 were described in table 1, and the particle size distribution of the ferrite powders was described in table 2.

Next, the cylindrical anisotropic bonded magnet according to the comparative example 1 was obtained in the same way as the example 1, by using the ferrite powders obtained as described above.

Then, when the magnet of the comparative example 1 was measured by the BH tracer, SQ(Area)0.878, Hk/iHc0.772 were shown. The results were shown in the list of table 1.

Comparative Example 2

The ferrite powders of comparative example 2 were obtained by the similar operation as the operation of the example 1, other than a point that $ZrO_2$ was not added at the time of producing the fine powders of (1) in the example 1, and the fine powders (30%) and the coarse powders (70%) obtained by (2) were weighed and mixed sufficiently.

The mean particle size, specific surface area, compressed density, σs, and the measured value of SFD of the ferrite powders of the comparative example 2 were described in table 1, and the particle size distribution of the ferrite powders was described in table 2.

Comparative Example 3

The ferrite powders of comparative example 3 were obtained by the similar operation as the operation of the example 1, other than a point that the fine powders (80%) obtained by (1) and the coarse powders (20%) obtained by (2) were weighed and mixed sufficiently in producing the mixed powders (ferrite powders).

The mean particle size, specific surface area, compressed density, σs, and the measured value of SFD of the ferrite powders of comparative example 3 were described in table 1.

Comparative Example 4

The ferrite powders of comparative example 4 were obtained by the similar operation as the operation of the example 1, other than a point that $ZrO_2$ addition amount was set to 10 mass % at the time of producing the fine powders of (1) in the example 1.

The mean particle size, specific surface area, compressed density, σs, and the measured value of SFD of the ferrite powders of the comparative example 4 were described in table 1.

Comparative Example 5

The ferrite powders of comparative example 5 were obtained by the similar operation as the operation of the example 1, other than a point that the fine powders and the coarse powders were weighed and mixed sufficiently, wherein the fine powders (30%) were obtained by setting the molar ratio of the iron oxide and the strontium carbonate in producing the fine powders of (1) in the example 1 set to 5.5:1, without adding $ZrO_2$, and the coarse powders (70%) were obtained by setting the molar ratio of the iron oxide and the strontium carbonate in producing the coarse powders of (2) to 5.9:1 and performing sintering at 1230° C. in the electric furnace.

The mean particle size, specific surface area, compressed density, σs, and the measured value of SFD of the ferrite powders of the comparative example 5 were described in table 1, and the particle size distribution of the ferrite powders was described in table 2.

(Conclusion)

The ferrite powders of the examples 1 to 10 contain the magneto-plumbite ferrite fine powders containing the oxide of at least one or more kinds of transition metals selected from the group consisting of Zr, Ti, Zn, Co, Mn, and Ni, having 20 mass % or more ratio of the particles having the particle size of 1 μm or less, or having the mean particle size of 0.20 μm or more and less than 1.00 μm, in the particle size distribution of

TABLE 1

| | Raw material powders | | | Mixing ratio of ferrite powders | | Properties of ferrite powders | | | Magnetic properties | | | |
|---|---|---|---|---|---|---|---|---|---|---|---|---|
| | Fine powders | | | Fine | Coarse | | | | | | | |
| | | Addition amount | | powders | powders | Mean | Specific | Com- | Ferrite | | Bonded magnet | |
| | Kind of metal oxide | of metal oxide (%) | Molar ratio | Mixing amount (%) | Mixing amount (%) | particle size (μm) | surface area (m²/g) | pressed density (g/cm³) | powders σ$_s$ (emu/g) | SFD | SQ (Area) | Hk/iHc |
| Example 1 | ZrO$_2$ | 0.5 | 5.6 | 20 | 80 | 1.22 | 2.48 | 3.45 | 57.4 | 0.9129 | 0.893 | 0.803 |
| Example 2 | ZrO$_2$ | 2.0 | 5.6 | 20 | 80 | 1.23 | 2.40 | 3.43 | 57.0 | 0.8482 | — | — |
| Example 3 | ZrO$_2$ | 2.0 | 5.6 | 30 | 70 | 1.13 | 2.76 | 3.45 | 56.6 | 0.8719 | — | — |
| Example 4 | TiO$_2$ | 2.0 | 5.6 | 20 | 80 | 1.30 | 2.32 | 3.42 | 56.4 | 0.8829 | — | — |
| Example 5 | ZrO$_2$ | 0.5 | 5.8 | 20 | 80 | 1.28 | 2.44 | 3.44 | 57.2 | 0.9068 | — | — |
| Example 6 | TiO$_2$ | 0.05 | 5.5 | 30 | 70 | 1.36 | 1.94 | 3.49 | 56.4 | 0.9023 | — | — |
| Example 7 | TiO$_2$ | 0.5 | 5.5 | 30 | 70 | 1.25 | 2.17 | 3.48 | 56.5 | 0.8994 | — | — |
| Example 8 | TiO$_2$ + ZnO | 0.1 + 0.1 = 0.2 | 5.5 | 30 | 70 | 1.34 | 1.92 | 3.49 | 57.4 | 0.9037 | — | — |
| Example 9 | TiO$_2$ + ZnO | 1.0 + 1.0 = 2.0 | 5.5 | 30 | 70 | 1.33 | 2.00 | 3.48 | 56.8 | 0.8792 | — | — |
| Example 10 | TiO$_2$ + ZrO$_2$ | 1.0 + 1.0 = 2.0 | 5.5 | 30 | 70 | 1.32 | 2.01 | 3.48 | 57.2 | 0.8689 | — | — |
| Com* example 1 | — | — | 5.6 | 20 | 80 | 1.29 | 2.27 | 3.47 | 56.4 | 0.9635 | 0.878 | 0.772 |
| Com* example 2 | — | — | 5.6 | 30 | 70 | 1.16 | 2.60 | 3.49 | 56.2 | 1.0753 | — | — |
| Com* example 3 | zrO$_2$ | 0.5 | 5.6 | 80 | 20 | 0.89 | 3.56 | 3.21 | 57.1 | 1.0091 | — | — |
| Com* example 4 | ZrO$_2$ | 10 | 5.6 | 20 | 80 | 1.30 | 2.55 | 3.42 | 57.2 | 0.9788 | — | — |
| Com* example 5 | — | — | 5.5 | 30 | 70 | 1.28 | 1.97 | 3.45 | 56.2 | 0.9844 | — | — |

Com* . . . Comparative

TABLE 2

| | Cumulative particle size distribution | | | | | | Particle size distribution | | | | | |
|---|---|---|---|---|---|---|---|---|---|---|---|---|
| | D5 (μm) | D10 (μm) | D16 (μm) | D50 (μm) | D84 (μm) | D90 (μm) | 0.3 μm ↓ (%) | 1 μm ↓ (%) | 3 μm ↑ (%) | 5 μm ↑ (%) | 7.2 μm ↑ (%) | 10.2 mμ ↑ (%) | 14.6 mμ ↑ (%) |
| Example 1 | — | — | — | — | — | — | — | — | — | — | — | — | — |
| Example 2 | 0.3 | 0.47 | 0.66 | 1.94 | 4.34 | 5.22 | 4.86 | 26.67 | 30.97 | 11.08 | 2.91 | 0.26 | 0 |
| Example 3 | 0.27 | 0.41 | 0.57 | 1.68 | 4.12 | 5.01 | 6.08 | 31.7 | 27.57 | 10.03 | 2.62 | 0.19 | 0 |
| Example 4 | — | — | — | — | — | — | — | — | — | — | — | — | — |
| Example 5 | — | — | — | — | — | — | — | — | — | — | — | — | — |
| Example 6 | 0.36 | 0.54 | 0.74 | 2.26 | 4.99 | 5.93 | 3.65 | 24.04 | 38.29 | 15.94 | 4.9 | 0.66 | 0 |
| Example 7 | 0.25 | 0.45 | 0.65 | 2.09 | 4.81 | 5.75 | 6.21 | 27.12 | 35.59 | 14.37 | 4.38 | 0.69 | 0.03 |
| Example 8 | 0.36 | 0.53 | 0.72 | 2.24 | 5.14 | 6.24 | 3.59 | 24.83 | 38.28 | 16.81 | 6.59 | 2.86 | 1.1 |
| Example 9 | 0.33 | 0.51 | 0.71 | 2.23 | 4.99 | 5.94 | 4.37 | 25.14 | 37.99 | 15.91 | 4.98 | 0.73 | 0 |
| Example 10 | 0.31 | 0.49 | 0.68 | 2.17 | 4.85 | 5.76 | 4.86 | 26.05 | 36.79 | 14.66 | 4.08 | 0.35 | 0 |
| Com* Example 1 | 0.32 | 0.5 | 0.7 | 2 | 4.41 | 5.29 | 4.47 | 25.59 | 31.93 | 11.45 | 2.99 | 0.25 | 0 |
| Com* Example 2 | 0.29 | 0.44 | 0.6 | 1.72 | 4.24 | 5.17 | 5.22 | 31.02 | 28.94 | 10.79 | 2.92 | 0.24 | 0 |
| Com* Example 3 | — | — | — | — | — | — | — | — | — | — | — | — | — |
| Com* Example 4 | — | — | — | — | — | — | — | — | — | — | — | — | — |
| Com* Example 5 | 0.28 | 0.51 | 0.73 | 2.22 | 5.03 | 5.98 | 5.37 | 24.78 | 37.96 | 16.16 | 5.19 | 0.9 | 0.19 |

Com* . . . Comparative the magneto-plumbite type ferrite powders obtained by the laser diffraction type particle size distribution analyzer, being the magneto-plumbite ferrite powders containing the oxide of at least one or more kinds of transition metals selected from the group consisting of Zr, Ti, Zn, Co, Mn, and Ni, having the average particle size set in a range of 0.20 μm or more and less than 5.00 μm, with the mixing amount of the magneto-plumbite-type ferrite fine powders being 15 mass % or more and 40 mass % or less. Also, the ferrite powders of the examples 1 to 10 contain the magneto-plumbite type ferrite coarse particles having the mean particle size of 1.00 μm or more and less than 5.00 μm. Meanwhile, the ferrite powders of the comparative examples 1, 2, 5 do not have the structure of containing the transition metal oxide.

From the results of tables 1 and 2, it is found that the ferrite powders of the examples 1 to 10 have nearly the same powder properties as the ferrite powders of the comparative examples 1, 2, 5.

However, when the ferrite powders of the examples 1 to 10, and the ferrite powders of the comparative examples 1 to 5 are compared in magnetic characteristics, it is found that the ferrite powders of the examples 1 to 10 are excellent in both σs and SFD.

Further, when the bonded magnet of the example 1 and the magnetic properties of the bonded magnet of the comparative example 1 were compared, it was found that the bonded magnet of the example 1 was more excellent in SQ, Hk/iHc, and was a product having high orientation and high magnetic force.

What is claimed is:

1. Ferrite powders for bonded magnet, comprising magneto-plumbite type ferrite fine powders having a mean particle size of 0.20 μm or more and less than 1.00 μm, wherein the magneto-plumbite type ferrite fine powders contain at least one oxide of a transition metal selected from the group consisting of Zr, Ti, Zn, Co, Mn, and Ni, and magneto-plumbite type ferrite coarse powders having a mean particle size of 1.00 μm or more and less than 5.00 μm, wherein a mixed amount of the magneto-plumbite type ferrite fine powders is 15 mass % or more and 40 mass % or less.

2. The ferrite powders for bonded magnet according to claim 1, wherein the magneto-plumbite type ferrite fine powders contain 0.01 mass % or more and 3 mass % or less of Zr oxide and/or Ti oxide.

3. A process for a production of ferrite powders for bonded magnet, comprising the steps of:

preparing a magneto-plumbite type ferrit to obtain fine powders having a mean particle size of 0.20 μm or more and less than 1.00 μm, wherein the fine particles contain at least one oxide of a transition metal selected from the group consisting of Zr, Ti, Zn, Co, Mn, and Ni;

preparing a magneto-plumbite type ferrite to obtain coarse powders having a mean particle size of 1.00 μm or more and less than 5.00 μm; and mixing the fine powders and the coarse powders, to produce ferrite powders with a mixing ratio of the fine powders and the coarse powders such that a mixed amount of fine powders is 15 mass % or more and 40 mass % or less.

4. A bonded magnet, wherein the ferrite powders for bonded magnet according to claim 1, are used as magnetic powders.

5. A bonded magnet, wherein the ferrite powders for bonded magnet according to claim 2, are used as magnetic powders.

6. The ferrite powders for bonded magnet according to claim 1, wherein the magneto-plumbite type ferrite fine powders contain 0.01 mass % or more and 3 mass % or less of Ti oxide and Zn oxide.

7. The ferrite powders for bonded magnet according to claim 1, wherein the magneto-plumbite type ferrite fine powders contain 0.01 mass % or more and 3 mass % or less of Zr oxide.

8. The ferrite powders for bonded magnet according to claim 1, wherein the magneto-plumbite type ferrite coarse powders have a mean particle size of 1.3 μm or more and less than 2.2 μm.

* * * * *